United States Patent [19]

Elward et al.

[11] Patent Number: 4,719,992

[45] Date of Patent: Jan. 19, 1988

[54] B-MOTOR WITH FLOATING LOCKING PLUG

[75] Inventors: Michael P. Elward, Wilkes Barre; Donald R. Lodwick, Clarks Summit, both of Pa.

[73] Assignee: Sandvik Steel Co., Clarks Summit, Pa.

[21] Appl. No.: 1,368

[22] Filed: Jan. 8, 1987

[51] Int. Cl.[4] ............................................. F03G 1/02
[52] U.S. Cl. ........................................ 185/43; 185/37; 185/39; 185/45; 242/107; 267/156
[58] Field of Search ................. 185/37, 39, 43, 45; 242/107; 267/156

[56] References Cited

U.S. PATENT DOCUMENTS

| | | | |
|---|---|---|---|
| 2,063,799 | 12/1936 | Fornelius et al. | 185/37 |
| 2,673,694 | 3/1954 | Howell | 267/156 X |
| 2,869,801 | 1/1959 | Foster | 267/156 X |
| 3,151,704 | 10/1964 | Clarke | 267/156 X |
| 4,113,201 | 9/1978 | Ziv | 242/107 |

OTHER PUBLICATIONS

Design Handbook—Engineering Guide to Spring Design—Associated Spring Barnes, Group Inc.; pp. 93 & 94, undated.
Mechanical Springs, A. M. Wahl; 2nd edition, McGraw-Hill Company, Inc.; 12-5, "Constant-Torque Spring Motor (Neg'ator B Motor)"; undated.

Primary Examiner—Allan D. Herrmann
Attorney, Agent, or Firm—Burns, Doane, Swecker & Mathis

[57] ABSTRACT

A spring motor comprises an output drum rotatably mounted to a casing and a first end of a spring attached to the output drum. A second end of the spring is attached to a free floating locking plug, around which the spring coils in an unstressed state. A pin is mounted near the output drum to prevent the locking plug from passing between the pin and the output drum.

20 Claims, 4 Drawing Figures

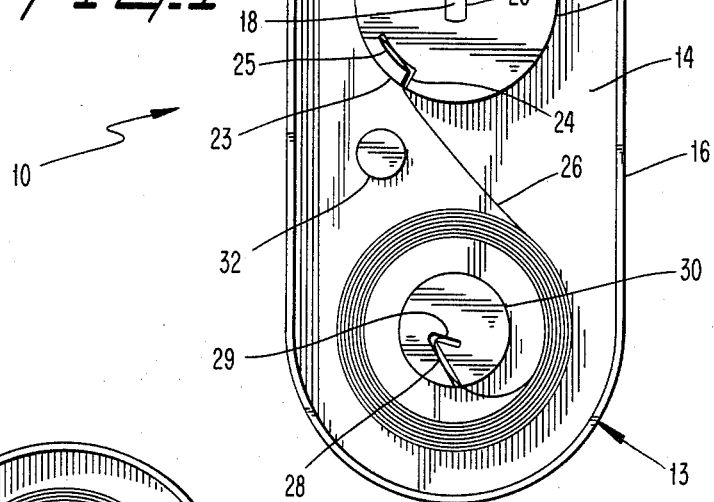
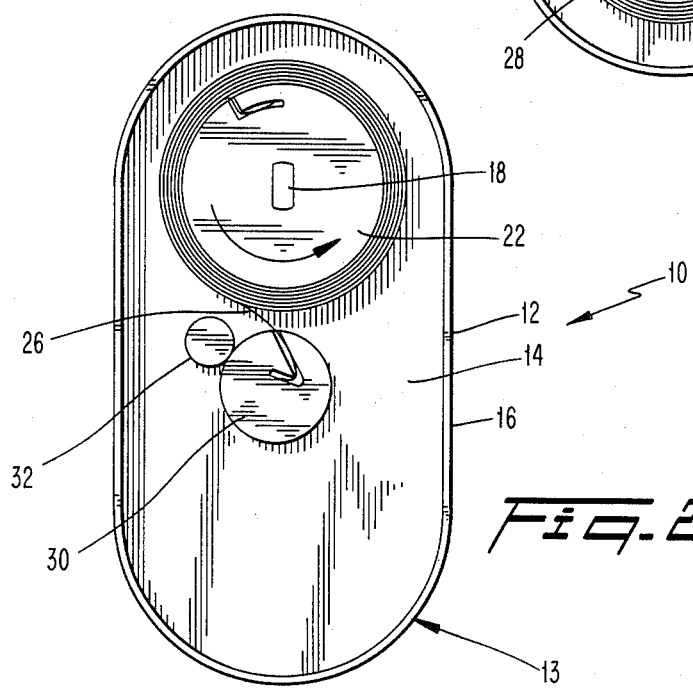

B-MOTOR WITH FLOATING LOCKING PLUG

BACKGROUND OF THE INVENTION

1. Field of the Invention

The present invention relates to spring motors, and in particular to spring motors commonly referred to in the industry as "B" motors, i.e., motors which have a substantially constant output torque.

2. Description of Related Art

Spring motors have been used in many applications such as in clocks, retractable tapes, wind-up toys, turntables for microwave ovens, etc.

A known spring motor includes an output drum rotatably mounted on an axle. Adjacent to the output drum is a storage drum, similarly rotatably mounted on an axle substantially parallel to the output drum axle. A tightly coiled noncumulative force ribbon spring is normally coiled on the storage drum. The inner end of the ribbon spring is connected to the storage drum by inserting the end into a slot in the storage drum.

The other end of the ribbon spring is riveted to the output drum in such a way that the ribbon spring can be wound onto the output drum in a reverse direction relative to the winding on the storage drum.

A spring motor of the above description is disclosed in U.S. Pat. No. 3,151,704, issued on Oct. 6, 1964 to Clarke. Similar spring motors are disclosed in U.S. Pat. No. 2,063,799, issued on Dec. 8, 1936 to Fornelius et al and in U.S. Pat. No. 2,673,694 issued on Mar. 30, 1954 to Howell.

In the known spring motors, the spacing between the mounted drums is not adjustable because the positions of the two axles are fixed. Therefore, those motors may require a relatively large amount of space.

U.S. Pat. No. 2,869,801, issued on Jan. 20, 1959 to Foster, discloses a spring motor having a pair of springs, each with a respective output drum. One end of each spring is mounted on its respective output drum in a conventional manner. The other end of the spring is simply tightly coiled so as to rest adjacent the output drum. A pin is provided adjacent each output drum to limit movement of the coils. A particular problem with this spring motor is that if it is wound too much, the free end of each spring will pass between its adjacent pin and output drum which would cause jamming of the motor.

OBJECTS AND SUMMARY OF THE INVENTION

In view of the foregoing limitations and shortcomings of the prior art devices, as well as other disadvantages of the prior art not specifically set forth above, it is an object of the present invention to provide an efficient and effective B-motor.

More particularly, it is an object of the present invention to provide a B-motor wherein the output drum and the storage drum are arranged in a compact manner.

It is another object of the present invention to provide a B-motor that is simple to assemble.

Yet another object of the present invention is to provide a B-motor that requires a minimum of stationary support parts.

It is still another object of the present invention to provide a B-motor having a minimum of moving parts.

It is a further object of the present invention to provide a convenient, yet secure, arrangement for attaching a ribbon spring to a drum.

Briefly described, these and other objects are accomplished according to the invention by providing a spring motor on a fixed frame. The motor comprises a spring and a drum for receiving the spring, the drum being rotatable relative to the fixed frame. A first end of the spring is attached to the drum. A plug element has a second end of the spring attached thereto and is free floating with respect to the frame. The spring is coiled about the plug when in an unstressed state. Means are provided on the frame, adjacent the drum, for preventing over-winding of the motor.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a top plan view of the spring motor according to the present invention in an unwound mode with the cover of the motor case removed;

FIG. 2 is a top plan view of the spring motor according to the present invention in a wound mode with the cover of the motor case removed;

DETAILED DESCRIPTION

Figure 3:
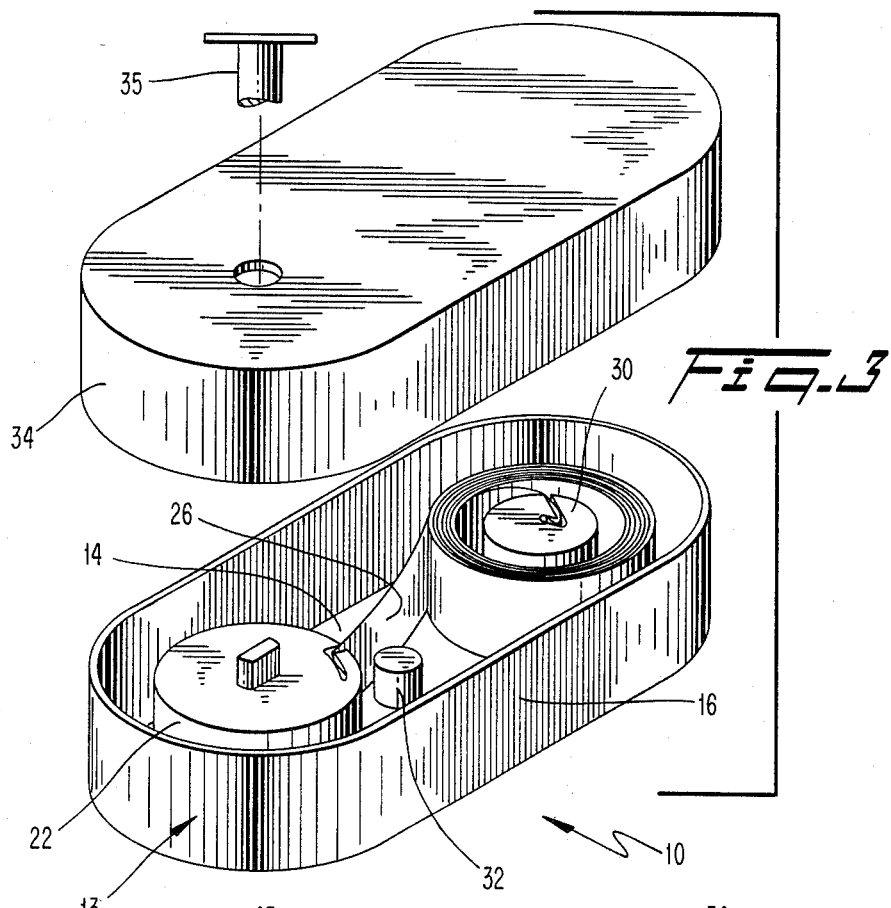
FIG. 3 is a perspective view of the spring motor according to the present invention illustrating the cover of the case positioned above the case.

Referring now in detail to the drawings, like parts are designated by like reference numerals throughout.

With reference to FIG. 1, a spring motor is generally designated by reference numeral 10. A lower portion 12 of a casing 13 for the motor has a substantially flat surface 14 and a peripheral wall 16.

An axle 18 is rotatably mounted through the flat surface 14 of the casing lower half 12 such that one portion (not shown) of the axle 18 extends into the surface 14 of the casing, and a second portion of the axle 18 extends into a chamber of the casing defined by the peripheral wall 16. The portion projecting into the casing chamber has flattened surfaces 20 formed at the end of the axle 18.

A spool or output drum 22 has a central opening with a shape corresponding to the shape of the axle 18 at the region of the flattened surfaces 20. The output drum 22 is mounted within the casing on the axle 18 and is rotatable with the axle 18. The output drum 22 has a slot 24 extending from its peripheral surface 23 inwardly toward the axle 18 to a predetermined position. A second slot 25 connects with the slot 24 and extends substantially parallel to the peripheral surface 23.

One end of a ribbon spring 26 is mounted within the slots 24 and 25. The other end of the spring 26 is inserted in a similar pair of slots 28, 29 provided in cylindrical locking plug 30. The spring 26 is coiled about the cylindrical locking plug 30 when in an unstressed state, as shown in FIG. 1. The ribbon is formed such that the natural diameter of the coil is slightly larger than the diameter of the locking plug. Thus, the coil does not fit tightly around the locking plug. The locking plug is not mounted to the casing, but floats freely within the casing.

A pin 32 is mounted in the lower half 12 of the casing, adjacent to the output drum 22. The pin is located such that the diameter of the spring 26, when fully wound onto the output drum 22, will not contact the pin 32. The pin 32 is positioned adjacent to the output drum 22 and prevents the cylindrical locking plug 30 from fitting between the pin 32 and the output drum 22.

In operation, a key 35 or other known means is used to wind the output drum 22 clockwise as shown in FIG. 1. Such winding causes the spring 26 to uncoil from the cylindrical locking plug 30 and be coiled around the output drum 22.

With reference to FIG. 2, when the motor 10 is fully wound, one end of the spring 26 will still be connected to the cylindrical locking plug 30, through the slots 28, 29. However, the majority of the spring 26 will be wound onto the output drum 22. The cylindrical locking plug 30 will not fit between the pin 32 and the output drum 22, as discussed above, thus preventing overwinding of the motor.

When the spring 26 is wound onto the output drum 22, the natural shape of the spring 26 will cause the spring 26 to unwind from the output drum 22 and to recoil itself on the locking plug 30 while exerting a useful torque on the axle 18 in a counterclockwise direction.

With reference to FIG. 3, an upper cover 34 is mountable onto the lower half 12 of the casing 13 to enclose the motor 10.

In an example of a preferred embodiment, the diameter of the output drum 22 is 1.4 inches and the diameter of the locking plug 30 is 0.75 inches. The ribbon spring 26 is 120 inches long, 0.5 inches wide, and 0.0061 inches thick. The modulus of elasticity of the spring is $27.5 \times 10^6$ psi.

The spring 26 is stressed such that its natural diameter is approximately 1.0 inch. The maximum outer fiber stress ($\delta$) of the spring is calculated to be $$\delta = Et\left(\frac{1}{d_n} + \frac{1}{d_3}\right),$$

wherein E = the modulus of elasticity, t = thickness of the spring, $d_n$ = the natural diameter of the spring, and $d_3$ = the diameter of the output drum. In the preferred embodiment, the maximum outer fiber stress is approximately 287,571 psi.

The torque applied by the spring 26 onto the axle 18 is calculated by the formula:

$$T = \frac{Ebt^3 d_3}{13}\left(\frac{1}{d_n} + \frac{1}{d_3}\right)^2,$$

wherein b = the spring width and the other variables are as set forth above. In the preferred embodiment, the spring 26 exerts a torque of about 0.94 in-lb. on the axle 18.

Fatigue life of the preferred embodiment is estimated to be approximately 8,000 cycles, neglecting effects of stress, corrosion, microcracks, sharp unannealed bends, nicks, scratches, etc.

Figure 4:
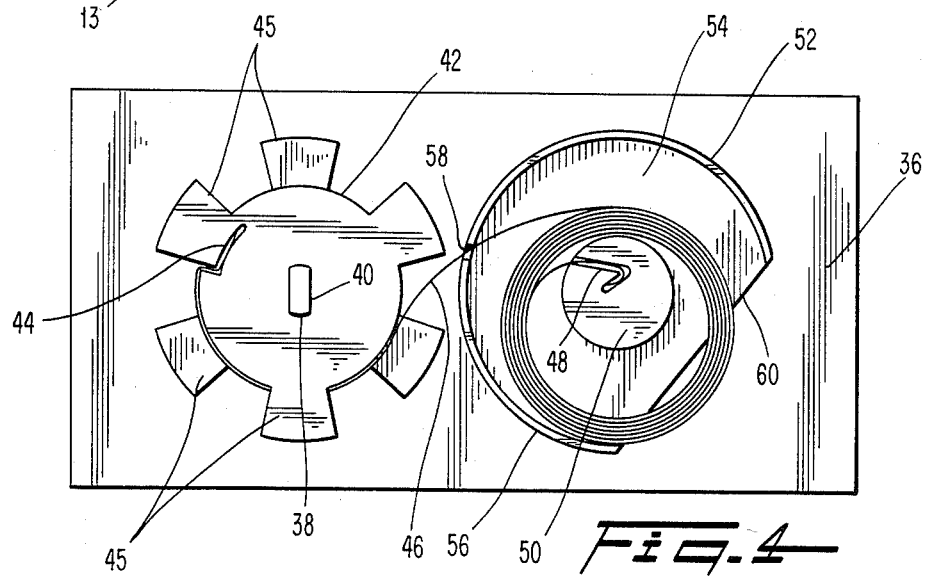
FIG. 4 is a top plan view of a second preferred embodiment of the present invention.

Referring now to FIG. 4, a second preferred embodiment of the present invention is provided on a frame 36.

An axle 38 is rotatably mounted to the frame 36. One end of the axle 38 has flattened surfaces 40.

A spool or output drum 42 has a central opening with a shape corresponding to the shape of the axle 38 having the flattened surfaces 40. The output drum 42 is mounted within the frame on the axle 38 so as to rotate with the axle 38. The output drum 42 has a slot 44 extending into the drum from its peripheral surface. Flanges 45 are provided on the drum 42 and extend radially therefrom at the top and bottom of the drum to contain the spring 46 within the area defined between the flanges.

One end of a ribbon spring 46 is mounted within the slot 44. The other end of the spring 46 is inserted in a similar slot 48 in a cylindrical locking plug 50 so as to be retained therein. The ribbon spring 46 is formed so that, in an unstressed state, the spring 46 is coiled about the cylindrical locking plug 50 in a manner similar to that shown in FIG. 1. The ribbon is formed such that the natural diameter of the coil is slightly larger than the diameter of the locking plug and therefore, the coil will not fit tightly around the locking plug. As in the previous embodiment, the locking plug is not mounted to the frame, but floats freely within a chamber as discussed below.

A chamber 52 is pivotably mounted to the frame 36 adjacent the plug 50. The chamber 52 is defined by a circular floor 54 and an upstanding peripheral wall 56 integral with the circular floor. The peripheral wall extends around about two-thirds of the periphery of the floor. If desired a cover (not shown) for the chamber 52 may be provided. A small vertical slit 58 in the wall 56 is provided for the spring 46 to pass through, and a gap 60 is provided in the wall 56 substantially opposite the drum 42.

The upstanding peripheral wall provides an abutment for the plug 50 when the spring 46 is retained substantially wound onto the drum 42. Since the spring 46 is in the slot 48, the plug 50 will be moved into an abutting relationship with the peripheral wall 56 when the spring 46 is substantially unwound from the plug 50 and onto the output drum 42. Accordingly, the abutment prevents the spring motor from being overwound as the abutment provides a positive stop to further movement of the plug and further winding of the spring 46 onto the output drum 42.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A spring motor, comprising:
    a frame for mounting the spring motor;
    a spring having a first end and a second end;
    means for receiving the spring and having the first end of the spring connected thereto, said means being rotatably mounted to said frame;
    free-floating means for receiving the spring and having the second end of the spring attached thereto, said spring being coiled around the free-floating means when the spring is in an unstressed state, the free-floating means being unattached to said frame; and
    fixed means mounted to said frame for preventing over-winding of the spring motor, said fixed means being mounted to said frame a predetermined distance from said means for receiving the first end of the spring.

2. The spring motor of claim 1, wherein means for receiving the spring is a spool, said spool having a slot in a peripheral surface, said first end of the spring being positioned and held within the slot.

3. The spring motor of claim 1, further comprising an axle rotatably mounted to the frame and said means for receiving the spring is mounted on the axle.

4. The spring motor of claim 3, wherein said axle has flat surfaces at one end thereof and said means for receiving the spring has shaped surfaces corresponding to the flat surfaces to prevent rotation between the axle and the means for receiving the spring.

5. The spring motor of claim 1, wherein said free-floating spring receiving means is a cylindrical plug provided with a slot in a peripheral surface.

6. The spring motor of claim 5, wherein the second end of the spring is positioned and held within the slot.

7. The spring motor of claim 1, wherein the fixed means for preventing over-winding is a pin.

8. The spring motor of claim 7, wherein the free-floating means is of a predetermined diameter so as to prevent passage through the predetermined distance between the pin and said receiving means for the spring.

9. The spring motor of claim 1, further comprising winding means for rotating the means for receiving the spring so as to wind the spring onto said means for receiving the spring.

10. The spring motor of claim 1, wherein the means for preventing over-winding of the motor includes a chamber having a floor and a peripheral wall so as to provide an abutment preventing movement of the free-floating means.

11. The spring motor of claim 10, wherein the chamber is pivotably mounted to the frame.

12. A spring motor, comprising:
a casing;
a spool arranged within said casing;
means for rotatably supporting said spool within said casing;
a spring having a first end connected to said spool;
a locking plug connected to a second end of said spring, said spring being coiled around said locking plug when said spring is in an unstressed condition, and said locking plug being movable in a plane parallel to a floor of the casing;
means for winding said spring from said locking plug to said spool so as to place said spring in a stressed condition; and
means for preventing over-winding of the spring onto said spool.

13. The spring motor of claim 12, wherein the means for rotatably supporting said spool is an axle fixed to the spool and rotatably mounted to the casing.

14. The spring motor of claim 12, wherein said spring is a ribbon spring having a modulus of elasticity of about $27.5 \times 10^6$ psi, a thickness of about 0.0061 inches and a width of about 0.5 inches.

15. The spring motor of claim 12, wherein said spool is provided with a slot in a peripheral surface and said first end of said spring is positioned and held within said slot.

16. The spring motor of claim 13, wherein said axle has flat surfaces at one end thereof and said spool has shaped surfaces corresponding to said flat surfaces to prevent rotation between the axle and the spool.

17. The spring motor of claim 12, wherein said locking plug is substantially cylindrical and is provided with a slot in a peripheral surface so as to receive and hold said spring within said slot.

18. The spring motor of claim 12, wherein said means for preventing overwinding is a pin positioned in said casing so as to prevent movement of said locking plug beyond a predetermined position.

19. A spring motor, comprising:
a casing;
an axle rotatably mounted in the casing;
an output drum mounted on the axle;
a ribbon spring having a first end connected to the output drum;
a locking plug movable with respect to the casing;
a second end of the spring connected to the locking plug, said ribbon spring being coiled around the locking plug when said spring is in an untensioned condition;
means for winding said spring from said locking plug to said drum so as to place said spring in a tensioned condition; and
a pin mounted in the casing adjacent the output drum so as to form a gap between the pin and the output drum of a size sufficient to prevent the locking plug from passing through the gap.

20. The spring motor of claim 19, wherein said axle has flat surfaces at one end thereof and said drum has shaped surfaces corresponding to said flat surfaces to prevent rotation between the axle and the spool.

* * * * *